(12) United States Patent
Maienschein

(10) Patent No.: US 12,115,857 B2
(45) Date of Patent: Oct. 15, 2024

(54) HYBRID DRIVE TRAIN

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 308 days.

(21) Appl. No.: 17/760,823

(22) PCT Filed: Jun. 30, 2020

(86) PCT No.: PCT/DE2020/100568
§ 371 (c)(1),
(2) Date: Mar. 16, 2022

(87) PCT Pub. No.: WO2021/058047
PCT Pub. Date: Apr. 1, 2021

(65) Prior Publication Data
US 2022/0388388 A1 Dec. 8, 2022

(30) Foreign Application Priority Data

Sep. 25, 2019 (DE) ............... 10 2019 125 872.3

(51) Int. Cl.
*B60K 6/30* (2007.10)
*B60K 6/38* (2007.10)
*B60K 6/40* (2007.10)
*F16F 15/14* (2006.01)

(52) U.S. Cl.
CPC ............... *B60K 6/30* (2013.01); *B60K 6/38* (2013.01); *B60K 6/40* (2013.01); *F16F 15/145* (2013.01); *B60Y 2400/426* (2013.01)

(58) Field of Classification Search
CPC .... B60K 6/30; B60K 6/38; B60K 6/40; F16F 15/145; F16F 15/20
See application file for complete search history.

(56) References Cited

U.S. PATENT DOCUMENTS

| 6,862,887 B2 * | 3/2005 | Noreikat | B60K 6/442 903/952 |
| 6,863,140 B2 * | 3/2005 | Noreikat | B60W 10/06 903/952 |
| 8,556,010 B2 * | 10/2013 | Ebert | B60K 6/40 180/65.25 |

(Continued)

FOREIGN PATENT DOCUMENTS

| DE | 102006034945 | 4/2008 |
| DE | 102012207941 | 12/2012 |

(Continued)

*Primary Examiner* — Jeffrey J Restifo
(74) *Attorney, Agent, or Firm* — Volpe Koenig

(57) ABSTRACT

A hybrid drive train for a motor vehicle including: a drive unit having an internal combustion engine, an electric machine and a separating clutch operatively arranged between these components; a transmission; and a hydrodynamic torque converter arranged between the transmission and the drive unit. In order to advantageously further develop a hybrid drive train of this type, at least one torsional vibration absorber is arranged between the internal combustion engine and a converter housing of the torque converter.

19 Claims, 1 Drawing Sheet

(56) References Cited

U.S. PATENT DOCUMENTS

| | | | |
|---|---|---|---|
| 8,845,484 B2* | 9/2014 | Kamiya | F16D 48/02 |
| | | | 192/3.3 |
| 8,978,799 B2* | 3/2015 | Arnold | B60K 6/48 |
| | | | 310/78 |
| 9,791,019 B2* | 10/2017 | Takikawa | F16F 15/134 |
| 10,060,504 B2* | 8/2018 | Rentfrow | F16H 45/02 |
| 10,066,720 B2* | 9/2018 | Miyahara | F16F 15/145 |
| 10,100,899 B2* | 10/2018 | Oh | F16F 15/145 |
| 10,288,158 B2* | 5/2019 | Saka | F16H 41/24 |
| 10,393,247 B2* | 8/2019 | Depraete | F16H 45/02 |
| 10,634,227 B2* | 4/2020 | Suzuki | F16H 45/02 |
| 10,955,037 B2* | 3/2021 | Watanabe | F16F 15/145 |
| 10,975,944 B2* | 4/2021 | Rentfrow | B60K 6/48 |
| 10,995,818 B2* | 5/2021 | Weber | B60K 6/40 |
| 11,009,124 B2* | 5/2021 | Li | F16D 7/048 |
| 11,047,461 B2* | 6/2021 | Wirachowski | B60K 6/48 |
| 11,280,393 B1* | 3/2022 | Flores | F16H 45/02 |
| 11,408,495 B2* | 8/2022 | Blischak | B60K 6/40 |
| 11,413,952 B2* | 8/2022 | Keller | F16D 25/10 |
| 11,469,646 B2* | 10/2022 | Payne | H02K 7/108 |
| 11,505,055 B2* | 11/2022 | Payne | F16H 45/02 |
| 11,621,596 B2* | 4/2023 | Großpietsch | H02K 7/04 |
| | | | 310/54 |
| 11,697,337 B2* | 7/2023 | Ogauchi | B60W 10/08 |
| | | | 475/5 |
| 11,739,821 B2* | 8/2023 | Hügel | B60K 6/387 |
| | | | 192/3.29 |
| 11,745,577 B2* | 9/2023 | Matsuoka | H02K 21/22 |
| | | | 60/341 |
| 11,752,855 B2* | 9/2023 | RÖßner | B60K 6/40 |
| | | | 180/65.285 |
| 11,788,584 B2* | 10/2023 | Maienschein | B60K 6/40 |
| 11,788,614 B2* | 10/2023 | Maienschein | F16D 25/0638 |
| | | | 192/3.25 |
| 11,796,032 B2* | 10/2023 | Schnädelbach | F16F 15/12346 |
| 11,904,695 B2* | 2/2024 | Binder | B60K 6/40 |
| 11,919,401 B2* | 3/2024 | Walega | F16H 45/02 |
| 2010/0087290 A1 | 4/2010 | Schoenek et al. | |
| 2011/0192692 A1 | 8/2011 | Werner et al. | |
| 2015/0298533 A1 | 10/2015 | Dogel et al. | |
| 2015/0369299 A1 | 12/2015 | Ludsteck et al. | |
| 2017/0050506 A1 | 2/2017 | Trinkenschuh et al. | |
| 2017/0314639 A1 | 11/2017 | Maienschein et al. | |
| 2019/0195312 A1 | 6/2019 | Fuhrer et al. | |
| 2020/0063804 A1* | 2/2020 | Reimnitz | F16D 25/082 |
| 2022/0219525 A1* | 7/2022 | Walega | B60K 6/40 |
| 2022/0371429 A1* | 11/2022 | Walega | B60K 6/48 |
| 2022/0379712 A1* | 12/2022 | Walega | B60K 6/387 |
| 2022/0388388 A1* | 12/2022 | Maienschein | B60K 6/30 |
| 2023/0012163 A1* | 1/2023 | Kim | F16H 57/021 |
| 2023/0038832 A1* | 2/2023 | Kim | F16D 25/10 |
| 2024/0001755 A1* | 1/2024 | Kim | B60K 6/387 |

FOREIGN PATENT DOCUMENTS

| | | |
|---|---|---|
| DE | 102012221618 | 6/2013 |
| DE | 102018126076 | 5/2019 |
| GB | 2543631 | 4/2017 |
| WO | 2008064633 | 6/2008 |
| WO | 2016060792 | 4/2016 |
| WO | 2017067554 A1 | 4/2017 |

\* cited by examiner

HYBRID DRIVE TRAIN

CROSS-REFERENCE TO RELATED APPLICATIONS

This application is the U.S. National Phase of PCT Appln. No. PCT/DE2020/100568, filed Jun. 30, 2020, which claims priority from German Patent Application No. 10 2019 125 872.3, filed Sep. 25, 2019, the entire disclosures of which are incorporated by reference herein.

TECHNICAL FIELD

The disclosure relates to a hybrid drive train for a motor vehicle comprising: a drive unit having an internal combustion engine, an electric machine and a separating clutch operatively arranged between same; a transmission; and a hydrodynamic torque converter arranged between the transmission and the drive unit.

Generic hybrid drive trains are known, for example, from DE 10 2012 221 618 A1, DE 10 2018 126 076 A1, WO 2008/064633 A1 and WO 2016/060792 A1. There, a hybrid drive unit is formed from an internal combustion engine and an electric machine, wherein a crankshaft of the internal combustion engine and a rotor of the electric machine can be connected to one another by means of a separating clutch. The rotor is connected to a housing of a hydrodynamic torque converter in a non-rotatable manner, the output hub of which is connected in a non-rotatable manner to a transmission input shaft of a transmission. The transmission, designed for example as an automatic transmission, drives the drive wheels of the motor vehicle, for example via a differential. To isolate torsional vibrations, a torsional vibration damper integrated in the housing of the torque converter is known from the publication WO 20126/060792.

SUMMARY

The object of the disclosure is to further develop a generic hybrid drive train. In particular, the object of the disclosure is to improve the torsional vibration isolation of a generic hybrid drive train.

The object is achieved by a hybrid drive train with one or more of the features disclosed herein.

The proposed hybrid drive train is intended for a motor vehicle with hybrid, fully electric or purely internal combustion engine operation. For this purpose, the hybrid drive train includes a drive unit with an internal combustion engine and an electric machine, wherein a separating clutch is operatively arranged between them. With the separating clutch closed, it is possible, for example, to drive in a hybrid operating mode, to start the internal combustion engine from the electric machine or to charge an electrical energy storage device such as an accumulator from the internal combustion engine by means of regenerative operation of the electric machine. When the separating clutch is open, for example, it is possible to drive in a fully electric drive mode or to recuperate.

A hydrodynamic torque converter is operatively arranged downstream of the rotor of the electric machine, i.e., upstream of a transmission, for example an automatic transmission, or between the transmission and the drive unit. The hydrodynamic torque converter is housed in a housing such as converter housing, wherein a pump wheel connected to the converter housing drives a turbine wheel. A guide wheel can be provided between the pump wheel and the turbine wheel to increase torque at low speeds, e.g., starting speeds of the motor vehicle. A converter lock-up clutch can be arranged between the converter housing and an output hub of the torque converter to bridge the torque converter, in particular at higher speeds after a start-up process and/or under propulsion for improved recuperation.

The output hub is advantageously connected to a transmission input shaft of the transmission in a torsionally locked manner. The transmission has several gear or shift stages, and the transmission output shaft transmits the torque to the drive wheels by means of a differential and/or a transfer case of an all-wheel drive system.

To isolate the torsional vibrations of the internal combustion engine affected by torsional vibration, a torsional vibration damper, for example a dual-mass flywheel, can be arranged between the crankshaft and the separating clutch. A centrifugal pendulum can be integrated into this torsional vibration damper. Alternatively or additionally, at least one torsional vibration damper can be integrated into the converter housing. For example, such a torsional vibration damper can be effective between the converter housing and the converter lock-up clutch. Alternatively or additionally, a torsional vibration damper can be operatively arranged between the turbine wheel and the output hub. This torsional vibration damper or these torsional vibration dampers can have a centrifugal pendulum.

According to the disclosure, at least one torsional vibration absorber is alternatively or additionally arranged between the drive unit and a housing of the torque converter. A torsional vibration absorber is a device in which at least one absorber mass displaceable in the circumferential direction is received relative to a carrier part. For example, the at least one torsional vibration absorber can be designed as a mass absorber, wherein at least one, preferably several, absorber masses distributed over the circumference are received on the carrier part so as to be rotatable to a limited extent relative to the carrier part about an axis of rotation of the hybrid drive train against the action of a spring device acting in the circumferential direction. Alternatively or additionally, the at least one torsional vibration absorber can be designed to be adaptive to rotational speed, for example in the form of a centrifugal pendulum or as a ring mass absorber.

In a centrifugal pendulum, absorber masses formed as pendulum masses are mounted in the centrifugal force field of the carrier part rotating about the axis of rotation by means of pendulum bearings so as to be pendulum-capable relative to it. The carrier part can be designed as a pendulum flange on which pendulum masses are received on both sides, wherein axially opposite pendulum masses are connected to one another to form pendulum mass units. The pendulum bearings can be formed between the pendulum masses and the pendulum flange, wherein a pendulum roller axially engages over running surfaces of the pendulum masses and the pendulum flange and rolls on the latter. Alternatively, the pendulum bearings can be formed between a central part connecting axially opposite pendulum masses received in recesses of the pendulum flange and the pendulum flange. The pendulum bearings are formed by raceways of the central parts and the pendulum flange, which are located radially one above the other and axially in line, with a pendulum roller rolling on each of them.

Alternatively, the carrier part can be formed from two axially spaced and interconnected sections, for example interconnected side parts, wherein the pendulum masses distributed over the circumference are received axially between the sections. The pendulum bearings are formed by raceways machined in the sections and in the pendulum masses, which are axially overlapped by a pendulum roller rolling on the raceways.

A ring mass pendulum is formed out of two mass parts that can be rotated relative to one another, wherein one mass part forms the support part and the other forms a ring mass. Pendulum masses are arranged in a manner distributed over the circumference, wherein a pendulum bearing is arranged between one of the mass parts and the pendulum masses and a bearing is arranged between the other mass part and a pendulum mass spaced apart in the circumferential direction, wherein the bearing is rigid in the circumferential direction and permits relative rotation between the pendulum mass and the mass part in the radial direction.

According to an advantageous embodiment of the hybrid drive train, the at least one torsional vibration absorber is arranged in a dry environment. In this manner, the at least one torsional vibration absorber can be designed largely independently of the housing shapes of the torque converter and churning losses of the at least one torsional vibration absorber, for example, with an impairment of its torsional vibration isolation properties, for example, of the absorber order of a centrifugal pendulum or ring mass pendulum, can be avoided.

The at least one torsional vibration absorber formed as a mass absorber can be designed for one or more absorber frequencies. The at least one torsional vibration absorber that is designed to be adaptive to rotational speed can be designed for a single or multiple absorber or excitation orders of the internal combustion engine. It is to be understood that several torsional vibration absorbers can be provided, which are tuned to different absorber frequencies and/or absorber orders. For example, a torsional vibration absorber that is adaptive to rotational speed can also be provided, which is designed for two or more absorber orders by correspondingly different design of the masses of the pendulum masses or the mass ring, pendulum paths, oscillation angle of the pendulum bearings, radius of the pendulum centers of gravity to the axis of rotation and/or the like.

The at least one torsional vibration absorber can be connected in a non-rotatable manner to an output part of the separating clutch and to the housing of the torque converter. For example, the separating clutch can be opened during stopping processes of the internal combustion engine so that no impacts, i.e., abrupt torque changes, act on the at least one torsional vibration absorber induced by the internal combustion engine on the at least one torsional vibration absorber, which can be damaging in particular to torsional vibration absorbers designed as centrifugal pendulums or at least cause comfort-reducing noises. In addition, when the internal combustion engine is switched off while driving, the rotational speed on the transmission side can be maintained at the at least one torsional vibration absorber. When the internal combustion engine is restarted, re-acceleration of the at least one torsional vibration absorber can be avoided.

The torque converter can be supported or centered by means of a separating wall between the internal combustion engine and the transmission. The separating wall can be arranged axially between the separating clutch and the torque converter or its converter housing. The separating wall can be received on a transmission bell housing of the transmission.

For example, the separating clutch and the at least one torsional vibration absorber can be arranged on one side of the separating clutch, and the torque converter with its converter housing and the electric machine can be arranged on the other side of the separating clutch. Preferably, the electric machine is arranged outside the converter housing. The stator can be received on the transmission bell housing of the transmission. The separating clutch can also be operated dry.

The separating clutch can be arranged radially inside the torsional vibration damper received on the crankshaft. The separating clutch can be actuated hydraulically, for example by means of a hydraulically displaced piston acting axially on the preferably closed separating clutch.

A central hub can be mounted in a rotatable manner on the separating wall on the one hand and on the transmission input shaft on the other. The rotor of the electric machine and the converter housing of the torque converter can be mounted and centered on this central hub in a non-rotatable manner. A further hub can be arranged in a rotatable manner around the central hub, which receives the carrier part of the at least one torsional vibration absorber and the output part of the separating clutch in a non-rotatable manner.

BRIEF DESCRIPTION OF THE DRAWINGS

The disclosure is explained in more detail with reference to the exemplary embodiments shown in FIGS. 1 and 2. In the figures.

DETAILED DESCRIPTION

Figure 1:
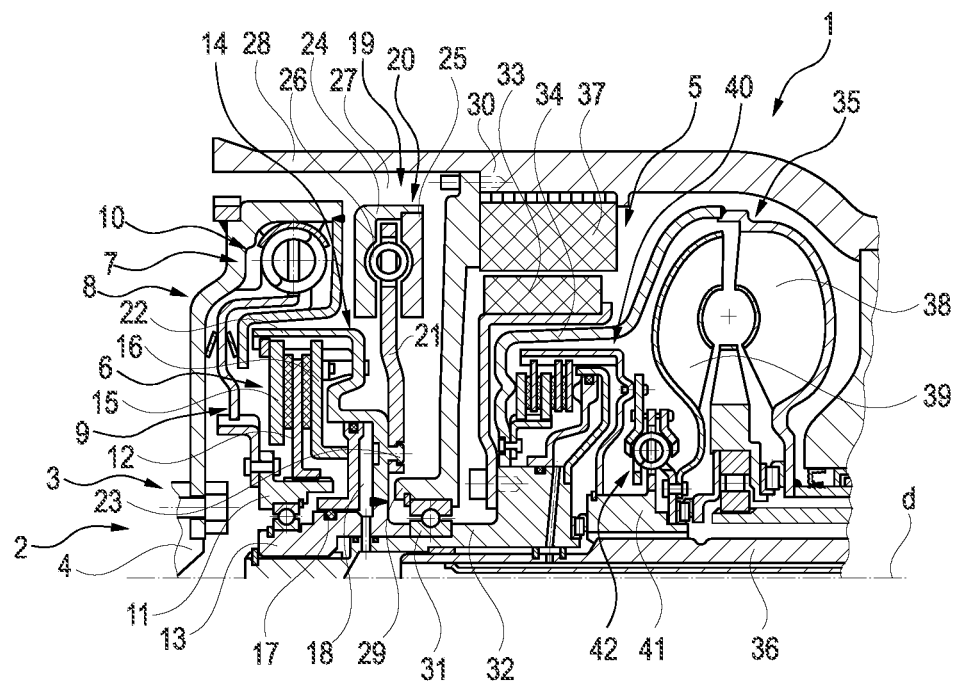
FIG. 1 shows a sectional view of the upper part of a hybrid drive train.

FIG. 1 shows a sectional view of the upper part of the hybrid drive train 1 arranged around the axis of rotation d. The drive unit 2 of the hybrid drive train 1 is formed by the internal combustion engine 3, of which only the crankshaft 4 is partially shown, and the electric machine 5, which are spatially separated from one another and can be connected to one another by means of the separating clutch 6.

Directly connected to the crankshaft 4 is the input part 8 of the torsional vibration damper 7, the output part 9 of which is arranged so as to be rotatable to a limited extent relative to the input part 8 against the action of the spring device 10 received in encapsulated form in the input part 8 and is centered on the input hub 11 of the separating clutch 6 in a non-rotatable manner.

The input hub 11 receives the clutch disc 12 of the separating clutch 6 in a rotationally locked manner and is received on the clutch hub 13 so as to be rotatable. The clutch disc 12 with its friction linings arranged on both sides forms a frictional engagement with the output part 14 of the separating clutch 6, which contains the axially fixed counterpressure plate 15 and the axially displaceable pressure plate 16. The pressure plate 16 is acted upon axially by the hydraulically displaceable piston 17, which is displaced as a function of the pressure applied in the pressure chamber 18. The separating clutch 6 is designed as a closed clutch and is arranged radially inside the spring device 10 of the torsional vibration damper 7.

The output part 14 of the separating clutch 6 is mounted on the clutch hub 13 in a non-rotatable and centered manner.

The torsional vibration absorber 19 is mounted on the output part 14 of the separating clutch 6 in a non-rotatable manner. The torsional vibration absorber 19 is formed here as a mass absorber 20, the carrier part 21 of which is connected to the output part 14 in a non-rotatable manner by means of rivets 23 protruding from the output plate 22. The absorber masses 24, 25 are arranged on both sides of the carrier part 21 distributed around the circumference. The helical compression springs 26 are operatively arranged in the circumferential direction and distributed over the circumference between the absorber masses 24, 25 and the carrier part 21, each of which is acted upon at the end by the carrier part 21 and the absorber masses 24, 25. The absorber masses 24, 25 are connected to one another radially outside the carrier part 21, wherein the absorber masses 24 are axially folded over radially on the outside and welded to the absorber masses 25, for example. It is to be understood that the circumferentially distributed absorber masses 24, 25 can be connected to one another in the circumferential direction to form an annular absorber mass.

The separating clutch 6 and the torsional vibration absorber 19 are arranged in the dry space 27 of the transmission bell housing 28 of the transmission, which is not shown in more detail. The dry space 27 is delimited in the direction of the transmission by means of the axially fixed separating wall 29. The separating wall 29 is attached, for example bolted or pinned, to the shoulder 30 of the transmission bell housing 28. Radially inward, the separating wall 29 receives the central hub 32 by means of the bearing 31 in an axially fixed and rotatable manner. The central hub 32 and the clutch hub 13 are connected to one another in a non-rotatable manner. Furthermore, the rotor 33 of the electric machine 5 and the converter housing 34 of the hydrodynamic torque converter 35 are received in a non-rotatable and centered manner with the central hub 32 on the side of the separating wall 29 opposite the separating clutch 6 and the torsional vibration absorber 19. In this manner, the transmission input shaft 36 of the transmission is relieved and the bearing is formed on the transmission bell housing 28, on which the stator 37 of the electric machine 5 is also received and centered.

The converter housing 34 receives the pump wheel 38 of the torque converter 35, which hydrodynamically drives the turbine wheel 39. Radially within the electric machine 5 and within the converter housing 34, the converter lock-up clutch 40 is located between the converter housing 34 and the output hub 41 of the torque converter 35. Between the output part of the converter lock-up clutch 40 and the output hub 41 on the one hand and the turbine wheel 39 and the output hub 41 on the other hand, the torsional vibration damper 42 is operatively arranged and thus effective as a so-called lock-up damper and as a turbine damper. The output hub 41 is connected to the transmission input shaft 36 in a non-rotatable manner.

This results in a torque flow from the crankshaft 4 of the internal combustion engine 3 via the torsional vibration damper 7 and the separating clutch 6 under action of the torsional vibration absorber 19 via the clutch hub 13 to the central hub 32 when the separating clutch 6 is closed. If necessary, additional torque is transmitted to the central hub 32 via the rotor 33. The torque is transmitted to the transmission input shaft 36 via the torque converter 35 or, if the torque converter lock-up clutch 40 is closed, via the latter with the torsional vibration damper 42 interposed via the output hub 41. Depending on the gear engaged in the transmission, torque is transmitted at the appropriate rotational speed at the transmission output shaft via a differential to the drive wheels.

When the separating clutch is open, a motor vehicle can be driven exclusively in an electric drive mode with the hybrid drive train 1 by means of the electric machine 5 or recuperation can take place. If the internal combustion engine 3 is stopped in the process, the torsional vibration absorber 19 continues to rotate at transmission speed so that it does not undergo any abrupt acceleration changes leading to noise and excessive load when the internal combustion engine is stopped and restarted.

Figure 2:
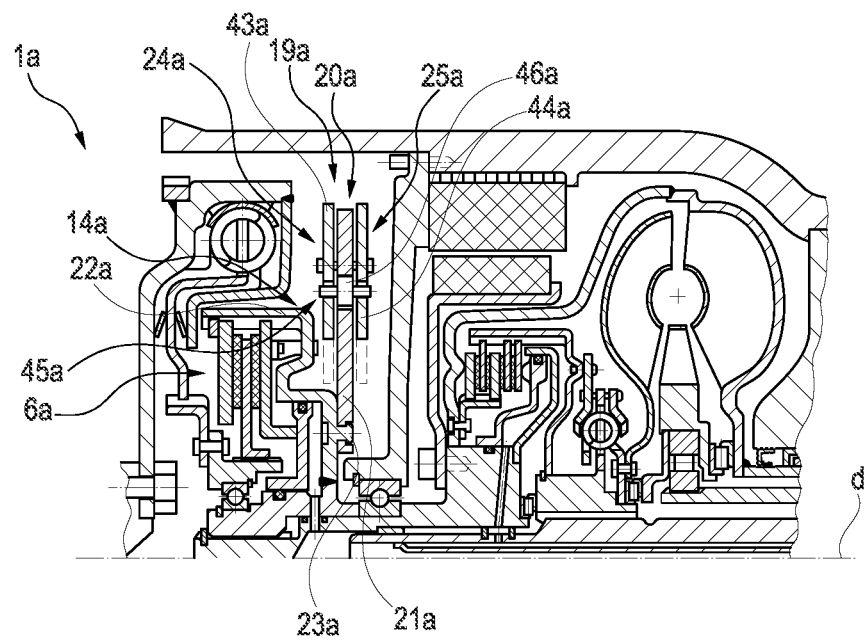
FIG. 2 shows a sectional view of the upper part of a hybrid drive train modified in comparison to the hybrid drive train in FIG. 1.

FIG. 2 shows a sectional view of the upper part of the hybrid drive train 1a arranged around the axis of rotation d, which is similar to the hybrid drive train 1 of FIG. 1. In contrast to the hybrid drive train 1, the hybrid drive train 1a features the torsional vibration absorber 19a, which is designed to be adaptive to rotational speed and is here formed as a centrifugal pendulum 20a. The centrifugal pendulum 20a is fixedly connected by means of its carrier part 21a, for example, to the output plate 22a of the output part 14a of the separating clutch 6a by means of the rivet boss 23a.

In the exemplary embodiment shown, the centrifugal pendulum 20a comprises absorber masses 24a, 25a arranged on both sides of the carrier flange 21a and formed as pendulum masses 43a, 44a. The pendulum masses 43a, 44a are suspended in the centrifugal force field of the carrier part 21a rotating about the axis of rotation d in dependence on pendulum bearings 45a formed between the carrier part 21a and the pendulum masses 43a, 44a along a predetermined pendulum path relative to the carrier part 21a.

The pendulum bearings 45a are each formed from two axially opposite, interconnected pendulum masses 43a, 44a and the carrier part 21a, wherein recesses with raceways are provided in each of these, on which a pendulum roller 46a reaching over the raceways rolls.

LIST OF REFERENCE SYMBOLS

1 Hybrid drive train
1a Hybrid drive train
2 Drive unit
3 Internal combustion engine
4 Crankshaft
5 Electric machine
6 Separating clutch
6a Separating clutch
7 Torsional vibration damper
8 Input part
9 Output part
10 Spring device
11 Input hub
12 Clutch disc
13 Clutch hub
14 Output part
14a Output part
15 Counterpressure plate
16 Pressure plate
17 Piston
18 Pressure chamber
19 Torsional vibration absorber
19a Torsional vibration absorber
20 Mass absorber
20a Centrifugal pendulum
21 Carrier part
21a Carrier part
22 Output plate
22a Output plate
23 Rivet boss
23a Rivet boss
24 Absorber mass
24a Absorber bass
25 Absorber mass
25a Absorber bass 26 Helical compression spring
27 Dry space
28 Transmission bell housing
29 Separating wall
30 Shoulder
31 Bearing
32 Central hub
33 Rotor
34 Converter housing
35 Torque converter
36 Transmission input shaft
37 Stator
38 Pump wheel
39 Turbine wheel
40 Converter lock-up clutch
41 Output hub
42 Torsional vibration damper
43a Pendulum mass
44a Pendulum mass
45a Pendulum bearing
46a Pendulum roller
d Axis of rotation

The invention claimed is:

1. A hybrid drive train for a motor vehicle, the hybrid drive train comprising:
a drive unit having an internal combustion engine, an electric machine, and a separating clutch operatively arranged between the internal combustion engine and the electric machine;
a transmission;
a hydrodynamic torque converter arranged between the transmission and the drive unit; and
at least one torsional vibration absorber arranged between the internal combustion engine and a converter housing of the torque converter, wherein the at least one torsional vibration absorber is connected in a non-rotatable manner to an output part of the separating clutch and to the converter housing of the torque converter.

2. The hybrid drive train according to claim 1, wherein the at least one torsional vibration absorber is arranged in a dry environment.

3. The hybrid drive train according to claim 1, wherein the torsional vibration absorber comprises a centrifugal pendulum that is adaptive to rotational speed.

4. The hybrid drive train according to claim 1, wherein the at least one torsional vibration absorber is matched to at least one excitation order of the internal combustion engine.

5. The hybrid drive train according to claim 1, wherein the separating clutch is arranged in a dry environment.

6. The hybrid drive train according to claim 1, wherein separating wall is arranged between the separating clutch and the torque converter.

7. The hybrid drive train according to claim 6, wherein the separating clutch and the at least one torsional vibration absorber are arranged on one side of the separating wall and the torque converter with the converter housing and the electric machine, arranged outside of the torque converter housing, are arranged on an other side of the separating wall.

8. The hybrid drive train according to claim 1, further comprising a torsional vibration damper arranged between a crankshaft of the internal combustion engine and the separating clutch.

9. The hybrid drive train according to claim 1, further comprising a converter lock-up clutch arranged within the converter housing of the torque converter.

10. The hybrid drive train of claim 1, further comprising a torsional vibration damper connected upstream of an output hub of the torque converter.

11. A hybrid drive train for a motor vehicle, the hybrid drive train comprising:
a drive unit having an internal combustion engine, an electric machine, and a separating clutch operatively arranged between the internal combustion engine and the electric machine;
a hydrodynamic torque converter arranged downstream of the drive unit; and
at least one torsional vibration absorber arranged between the internal combustion engine and a converter housing of the torque converter that is rotationally fixed to the torque converter housing, such that the at least one torsional vibration absorber is arranged between the separating clutch and the hydrodynamic torque converter.

12. The hybrid drive train according to claim 11, wherein the at least one torsional vibration absorber is arranged in a dry environment.

13. The hybrid drive train according to claim 11, wherein the torsional vibration absorber comprises a centrifugal pendulum that is adaptive to rotational speed.

14. The hybrid drive train according to claim 11, wherein the at least one torsional vibration absorber is matched to at least one excitation order of the internal combustion engine.

15. The hybrid drive train according to claim 11, wherein the separating clutch is arranged in a dry environment.

16. The hybrid drive train according to claim 11, wherein a separating wall is arranged between the separating clutch and the torque converter.

17. The hybrid drive train according to claim 16, wherein the separating clutch and the at least one torsional vibration absorber are arranged on one side of the separating wall and the torque converter with the converter housing and the electric machine, arranged outside of the torque converter housing, are arranged on an other side of the separating wall.

18. The hybrid drive train according to claim 11, further comprising a torsional vibration damper arranged between a crankshaft of the internal combustion engine and the separating clutch.

19. The hybrid drive train according to claim 11, further comprising a converter lock-up clutch arranged within the converter housing of the torque converter.

* * * * *